United States Patent
Gass et al.

(10) Patent No.: US 7,783,020 B2
(45) Date of Patent: Aug. 24, 2010

(54) METHOD FOR SENDING CALLING COMMUNICATION TERMINAL LOCATION DATA TO A CALL CENTER

(75) Inventors: Raymond Gass, Bolsenheim (FR); Michel Le Creff, Vigny (FR)

(73) Assignee: Alcatel Lucent, Paris (FR)

( * ) Notice: Subject to any disclaimer, the term of this patent is extended or adjusted under 35 U.S.C. 154(b) by 388 days.

(21) Appl. No.: 10/589,027

(22) PCT Filed: Jan. 26, 2005

(86) PCT No.: PCT/FR2005/000184
§ 371 (c)(1), (2), (4) Date: Aug. 10, 2006

(87) PCT Pub. No.: WO2005/088948
PCT Pub. Date: Sep. 22, 2005

(65) Prior Publication Data
US 2007/0201645 A1 Aug. 30, 2007

(30) Foreign Application Priority Data
Feb. 11, 2004 (FR) .................................. 04 50245

(51) Int. Cl.
*H04M 15/06* (2006.01)
(52) U.S. Cl. .................. 379/142.1; 379/45; 379/127.01; 379/120; 379/143; 455/466; 455/464
(58) Field of Classification Search .................. 379/45, 379/37, 42; 455/404.1, 404.2
See application file for complete search history.

(56) References Cited

U.S. PATENT DOCUMENTS

| | | | | |
|---|---|---|---|---|
| 6,101,240 A | * | 8/2000 | Blair et al. ..................... | 379/45 |
| 6,104,784 A | * | 8/2000 | Robbins ....................... | 379/45 |
| 6,243,442 B1 | * | 6/2001 | Tanaka et al. ................. | 379/45 |
| 6,249,252 B1 | * | 6/2001 | Dupray ........................ | 342/450 |
| 6,314,281 B1 | * | 11/2001 | Chao et al. ............... | 455/404.2 |
| 6,397,054 B1 | * | 5/2002 | Hoirup et al. ............ | 455/404.1 |
| 6,415,018 B1 | * | 7/2002 | Antonucci et al. ............ | 379/45 |
| 6,466,788 B1 | * | 10/2002 | Carlsson ................... | 455/435.2 |

(Continued)

FOREIGN PATENT DOCUMENTS

DE 29911129 U 9/1999

(Continued)

*Primary Examiner*—Curtis Kuntz
*Assistant Examiner*—Phung-Hoang J Nguyen
(74) *Attorney, Agent, or Firm*—Fay Sharpe LLP

(57) ABSTRACT

This method is used to send data representative of the location of communication terminals (T) to a call center (ECC) without using information processing means in the terminals and to send via heterogeneous communication networks (RP, RPT). This method consists, in the event of requesting the setting up of a telephone call between a terminal (T) and the call center (ECC) by means of a dedicated calling number, in sending the call center a signaling message for setting up the connection and comprising a selected call identifier and a text type message including data representative of the location of the calling terminal (T) and the selected call identifier. At the call center, the method consists in associating the signaling message received by the call center with the location data contained in the text message received by the call center if the signaling message and the text message include the same call identifier.

12 Claims, 1 Drawing Sheet

U.S. PATENT DOCUMENTS

| | | |
|---|---|---|
| 6,686,139 B2 * | 2/2004 | Kanazawa et al. .......... 430/529 |
| 6,771,742 B2 * | 8/2004 | McCalmont et al. .......... 379/45 |
| 6,907,238 B2 * | 6/2005 | Leung ..................... 455/404.1 |
| 7,110,746 B2 * | 9/2006 | Herzog et al. ............... 455/411 |
| 2002/0193123 A1 | 12/2002 | Herzog et al. |
| 2005/0111630 A1 * | 5/2005 | Potorny et al. ................ 379/45 |

FOREIGN PATENT DOCUMENTS

WO  WO 02/33897 A  4/2002

* cited by examiner

METHOD FOR SENDING CALLING COMMUNICATION TERMINAL LOCATION DATA TO A CALL CENTER

The invention concerns sending a call center location data for communication terminals that have called said call center, in particular when setting up an emergency call.

Here the expression "communication terminal" means any fixed or mobile terminal able to exchange data or signals with a communication network, in particular a telephone terminal.

As the person skilled in the art is aware, in certain countries there are laws that impose the communication to a call center called by a communication terminal using a dedicated number of data representative of its geographical location. This applies in particular to the emergency number 112 used in Europe and the emergency number 911 used in the United States of America to contact security services or government agencies to report an event of an urgent nature.

A certain number of technical solutions can be used at present to determine the geographical position of a calling communication terminal at least approximately, in particular in cellular type telephone networks (public land mobile networks (PLMN)), analog type telephone networks (public switched telephone networks (PSTN)) and digital type telephone networks (integrated services digital networks (ISDN)).

Moreover, in the networks cited above, the operator is generally in a position to send the call center location data for a calling terminal that is connected to its network. However, a call center can associate that call data with the telephone call from a terminal only if it is connected directly to said network itself. In other words, it is very difficult, if not impossible, for a call center to associate location data with a telephone call if the telephone call and the location data must pass successively through networks of different types (heterogeneous networks) to reach it.

In practice this is often the case, because the call centers are connected to the fixed public telephone network but the calls may come from highly diverse networks: for example, if an emergency call center is connected to the public switched network and a call set-up request comes from a terminal connected to a business network, a call is set up via two networks of different types which do not use the same data transmission protocols, namely a corporate network and the public switched network. The business network PABX could send location data, but it would use one of a large number of protocols used to send data in business networks. For the call center to be able to receive and process this data is would have to include a gateway adapted to the protocol concerned. In practice it is not possible to provide a gateway adapted to all the data transmission protocols used in business networks.

The document WO 02/33897 A2 describes a business network able to send an emergency call center data representative of the location of a communication terminal requesting it to set up an emergency call. The communication terminal is a data processing machine (for example a personal computer or a Voice over Internet Protocol type telephone) that is used to set up a data type call or a voice type call to a call center via a data transmission network using the Internet Protocol, for example. In one implementation, when a user wishes to set up a telephone connection between his terminal and the emergency call center, his terminal recognizes that it is an emergency call and activates a location device that supplies data reflecting the location of the terminal to a location server. The latter places that data in a location message and sends that message to the call center via the data transmission network. In parallel with this a telephone call is set up between the terminal and the call center. The call center must associate the location message and the message requesting to set up an emergency call. To provide for this association, the terminal uses its data processing means to supply an unambiguous call identifier that is inserted into the signaling message requesting call set-up and into the location message including data representative of the location of the calling terminal.

The above prior art method has the advantage of sending location data using a very widely used network protocol (the Internet Protocol) and a very widely used network (the Internet), but cannot be used in conventional business networks including digital or analog telephones with few if any data processing resources. If a telephone of this kind requests to set up an emergency telephone call, the emergency call center cannot determine its precise location as it receives only the telephone number of the (business) PABX to which that terminal is connected. The terminal is unable to provide more precise location data in a call set-up request message or to supply an unambiguous call identifier enabling a location message to be associated with an emergency call set-up request message.

Thus a first object of the invention is to propose a method for sending a call center data representative of the location of a communication terminal that does not necessitate data processing means in the terminal.

The invention consists in a method of sending a call center data representative of the location of a communication terminal, consisting, in the event of a request to set up a call between that terminal and that call center, in:

constituting and then sending to the call center:
   a signaling message requesting the setting up of a call between this terminal and a call center and comprising an unambiguous call identifier, and
   a location message comprising data representative of the location of the calling terminal and the same call identifier, and
in the call center, associating a signaling message and a location message received by the call center and comprising the same call identifier,
characterized in that, to constitute the signaling message comprising an unambiguous call identifier, an unambiguous call identifier is generated in a network node receiving the signaling message sent by the terminal and requesting the setting up of a call and that unambiguous call identifier is then integrated into a signaling message sent to the call center and requesting the setting up of a call, and, to constitute the location message comprising the call identifier, a location message is generated and the same call identifier is integrated into that location message.

Ignoring the fact that the signaling messages requesting call set-up must reach that node for it to be able to detect a call set-up request message, the above method can be used by terminals with no intelligence, in particular conventional telephone terminals, because the call identifiers are created in a network node independent of the terminals.

A second object of the invention is to send a call center data representative of the location of communication terminals via a succession of heterogeneous communication networks.

A preferred embodiment of the method of the invention is characterized in that said signaling message is a text message.

The method so characterized can send data representative of the location via a succession of heterogeneous communication networks because all existing telecommunication networks, even analog networks, include means for sending text messages.

A text message may be sent by any conventional messaging service, either in the form of electronic mail (e-mail) or in the form of an SMS (short message service) type short message. One implementation in a synchronous time-division multiplex integrated services digital network consists in using the user-to-user signaling channel to send a text message.

The location data of the calling terminal may be determined by means of a location server that is part of the network to which the calling terminal is connected, for example, after which the text message is generated and sent by means of a text message server of that network.

The text message may include a field dedicated to data representative of the nature of the call identifier, for example, followed by a field dedicated to the call identifier and at least one field dedicated to data representative of the location, and preferably three such fields (a first field dedicated to the measured latitude, a second field dedicated to the measured longitude, and a third field dedicated to the measured altitude).

The nature of the call identifier preferably indicates if the number is a direct dialing in (DDI) number, a pseudo-DDI number, a generic number, a generic number and a pseudo-DDI number, or a generic number and an area identifier. The text message may further include at least three fields respectively dedicated to the measured latitude, the measured longitude and the measured altitude.

The text message may further include a field dedicated to data representative of the type of altitude measurement (for example meters (feet) above sea level or a storey number).

Moreover, the core identifier is preferably placed in one of the three fields of the signaling message.

Finally, the call identifier is a number selected from a selected set of numbers, for example, possibly specific to the network to which the calling terminal is connected.

The invention also proposes a device for aiding the location of a communication terminal by a call center, characterized in that it comprises means for:
  receiving a signaling message sent by the terminal and requesting the setting up of a call between the terminal and a call center and then determining an unambiguous call identifier,
  then instructing the sending of that call identifier to said call center in a signaling message requesting the setting up of a call,
  generating a text type message including data representative of the location of said calling terminal and the same calling identifier, and
  instructing the sending of said text message to said call center so that said call center can associate the location data that it contains with said signaling message requesting the setting up of a call.

Other features and advantages of the invention will become apparent on reading the following detailed description and examining the appended drawing, in which.

The appended drawing constitute part of the description of the invention as well as contributing to the definition of the invention, if necessary.

An object of the invention is to send to a call center via heterogeneous communication networks location data of communication terminals that have called the call center using a dedicated number, possibly an emergency number.

In the following description the expression "heterogeneous communication networks" refers to networks of different types, for example private networks, wireless local area networks (WLAN), Bluetooth networks or ultra wide band (UWB) networks, public or private cellular networks (public land mobile networks (PLMN)), such as GSM, GSM/GPRS and EDGE networks, analog telephone networks (public switched telephone networks (PSTN)), digital networks (integrated services digital networks (ISDN)), and public or private data networks (such as the Internet).

Moreover, in the following description the expression "communication terminal" refers to any fixed or mobile terminal able to exchange data or signals with a communication network, for example fixed or mobile (or cellular) telephones, personal digital assistants (PDA), fixed or portable computers equipped with a communication interface, or servers. These terminals may also be equipped with a network interface controller card or a wireless adaptor operating in accordance with the Ethernet standard 802.11.

Finally, in the following description the expression "call center" refers to any communication terminal that can be called using a dedicated number to set up a telephone conversation and capable of receiving and displaying text type messages, for example electronic mail (e-mail) or SMS (short message service) type short messages, for example fixed or cellular telephones having a display screen, fixed or mobile computers with communication means, or a combination of these terminals of different types.

The invention is aimed in particular, although not exclusively, at emergency call centers used to contact emergency services or government agencies to report an event of an urgent nature, and in particular call centers whose dedicated number is 112 in Europe or 911 in the United States of America.

Figure 1:
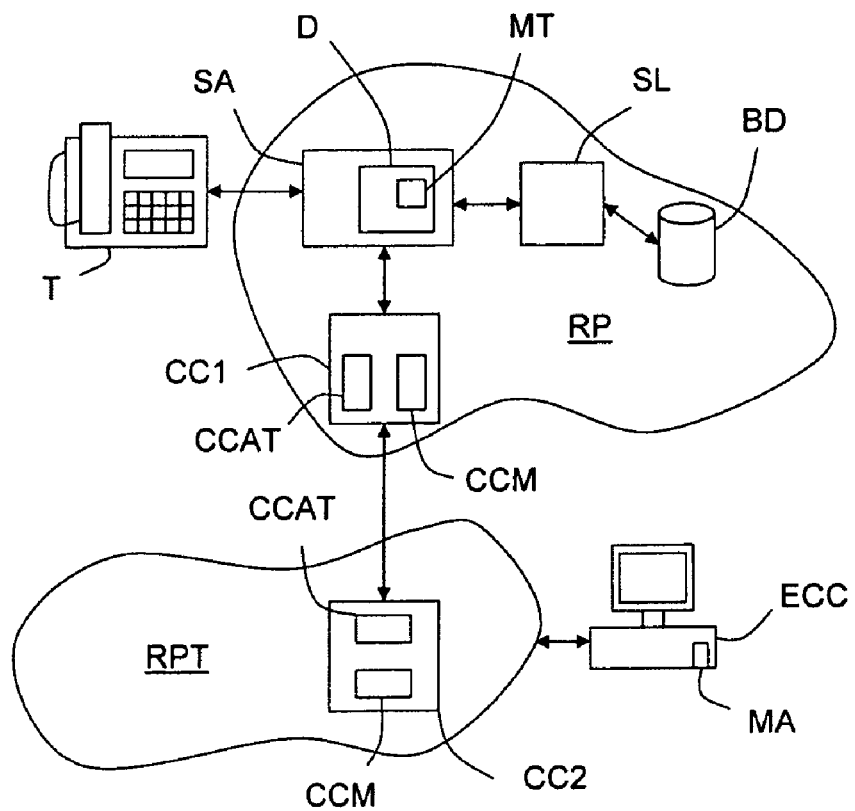
FIG. 1 is a diagram of one embodiment of a communication installation equipped with one embodiment of a location aid device for implementing the method of the invention.

FIG. 1 is a highly diagrammatic representation of a communication installation including, by way of illustrative example, a private network RP belonging to one or more businesses, for example, a university or a building manager, such as an office block manager, and connected to a public telephone network RPT.

Of course, the invention is not limited to this example of an installation, and in particular to the selected combination and number of networks. Thus one or more cellular or non-cellular telephone networks could coexist with one or more data networks and/or one or more cable or wireless local area networks.

The private network RP is a cable local area network (LAN), for example, comprising a call server SA to which are connected communication terminals T, for example fixed telephones and computers, a location server SL, for example of the location information server (LIS) type, coupled to a database BD containing in particular location data concerning the terminals T connected to the private network RP, and at least one switching center (or gateway) CC1 which here is coupled to the public telephone network RPT.

The switching center CC1 is a business PABX (private automatic branch exchange), for example.

It is considered hereinafter, by way of example, that the switching center CC1 combines telephone call switching center (CCAT) and message switching center (CCM) functions (SMS type messages and electronic mail type messages). However, those functions could be implemented by different centers, of course.

The location server SL is adapted to determine the geographical position of the terminals T that are connected to its network RP. Any means may be envisaged for effecting this task. For example, a table stored in the database BD could be consulted to establish a match between the identifiers of terminals T and rooms in buildings. In this case, on receiving a terminal identifier T the location server SL must determine the geographical position that corresponds to the room in which the terminal T is connected to the network RP. The table could instead establish directly a match between identifiers of terminals T and geographical positions. In this case, on receiving a terminal identifier T the location server SL determines the geographical position of the terminal T directly from the table.

It is important to note that the invention does not relate to the mode of locating the terminal, but to the mode of sending location data to a call center ECC. Consequently, any technique for locating the terminal may be envisaged. Thus if the terminal T is a mobile (or cellular) telephone connected to a cellular network, for example of the UMTS type, it may be approximately located by determining the cell in which it is situated, and possibly by triangulation using its previous locations and/or the geographical positions of adjacent cells. This kind of location is generally effected with the aid of what the person skilled in the art calls the home location register (HLR), which contains static and dynamic information on the mobile terminals T (last known location or position of the last cell used).

The public telephone network RPT is an ISDN type digital network, for example, connected to the switching center CC1 of the private network RP by a switching center (or gateway) CC2.

It is considered hereinafter, by way of example, that the switching center CC2 groups the telephone call switching center (CCAT) and message switching center (CCM) functions (SMS type messages or electronic mail type messages). However, those functions could be implemented by different centers, of course.

In the example shown, a single call center ECC is connected to the public telephone network RPT. However, a plurality of call centers could be connected to the public telephone network RPT or to other telephone or data networks of the installation.

It is considered hereinafter, by way of example, that the call center ECC is an emergency call center that can be contacted by entering the emergency number 112. However, the number entered could be the number 911 used in the United States of America to contact a public safety answering point (PSAP).

According to the invention, each time that a terminal T, here connected to the private network RP, requests the setting up of a telephone call to the emergency call center ECC by entering the number 112, the emergency call center ECC is sent a signaling message for setting up said connection and including a selected call identifier together with a text type message including data representative of the location of the calling terminal T and the selected call identifier. The signaling message received by the emergency call center ECC is associated with the location data contained in the text message received by the emergency call center ECC if those messages contain the same call identifier.

The signaling message is preferably sent on the user-to-user signaling channel that is made available to the calling and called terminals by the operator so that they can exchange end-to-end type signaling throughout the duration of their call.

As the person skilled in the art is aware, this user-to-user signaling channel is used to send (free of charge) signaling messages of at least 128 bytes. It is therefore possible to send the emergency call center ECC a call identifier (call reference) associated for the time being with the calling terminal T and occupying a small number of bytes (for example two bytes) inside a signaling message. That signaling message preferably contains information preceding the call identifier and indicating synchronization of that call identifier in the context of an emergency call.

To enable the detection of an (emergency) call request followed by the determination of a call identifier and the generation of a text message, the invention proposes to equip the call server SA with a location aid device D.

That device D is preferably installed in the call server SA because it is connected to the terminals T and therefore receives their connection set-up requests and to the switching center CC1 that sends signaling messages and text messages to the public telephone network RPT.

The device D comprises a processor module MT that observes the numbers entered by the terminals T at the time of their connection set-up requests in order to separate out requests using the number 112. Of course, the processor module MT could be adapted to separate out requests using a plurality of selected emergency numbers.

Once the processor module MT has retained a request, it immediately generates an unambiguous core identifier that is preferably selected from a set of predefined numbers, which set may be specific to the private network RP to which the calling terminal T is connected. It may be the E.164 set, for example, or the ELIN set.

The processor module MT then instructs the switching center CC1 to integrate the call identifier into a call set-up request signaling message in order for the switching center CC1 to send it to the public telephone network RPT and to the emergency call center ECC on the user-to-user signaling channel.

At substantially the same time as the processor module MT is determining the call identifier, it consults the location server SL to obtain the geographical position (or location) corresponding to the (telephone) identifier of the calling terminal T contained in its connection set-up request.

If the processor module MT has data representative of the location of the calling terminal T, it generates a text message containing that location data and then instructs the switching center CC1 to send it to the public telephone network RPT and to the emergency call center ECC here designated by the number 112.

It is important to note that the (emergency) number used by the calling terminal T may designate more than one (emergency) call center associated with identical or different responses in order to be adapted to the sites, premises or areas in which the various terminals T of the private network RP are situated. In this case, the processor module MT is adapted to look up in a location/call center correspondence table the emergency call center that corresponds to the location of the calling terminal T in order to send it the signaling message and the text message.

The switching center CC1 preferably sends the text message generated by the device D in the form of an electronic mail (e-mail) or even more preferably in the form of an SMS (short message service) type short message.

The text message comprises at least one field dedicated to the call identifier and one field dedicated to the location data. Three location data fields are preferably provided, a first field dedicated to the measured latitude, a second field dedicated to the measured longitude, and a third field dedicated to the measured altitude.

However, it is preferable for the text message also to comprise, especially if it is an SMS type message, at least one field dedicated to data representative of the nature of the call identifier. In the present context the expression "nature of the call identifier" refers to information indicating if the call identifier designates a direct dialing in (DDI) number, a pseudo-DDI number, a generic number, a generic number and pseudo-DDI number, or even a generic number accompanied by an area identifier (or number).

More precisely, a calling terminal T may have the DDI number 99999 in a business accessible from the outside using the number 88 88 89 99 99, for example. In this case a nature field having the value "DDI" is sent followed by a number field having the value 88 88 89 99 99.

If the calling terminal T has a speed dial number 99999 that is not of DDI type, the number of the business to which it belongs is 88 88 89 99 00, and that business has 20 lines, a pseudo-DDI can therefore be used that is selected from the numbers ranging from 88 88 89 99 01 to 88 88 89 99 20 to designate the calling terminal T. In this case, a nature field of value "pseudo-DDI" is sent followed by a number field with the value 88 88 89 99 08, for example.

If the calling terminal T has a speed dial number 99999 that is not of DDI type and that its user does not wish to communicate (knowing that location data will come from elsewhere) and if the number of the business to which it belongs is 88 88 89 99 00, a generic number (that of the business) can therefore be used to designate the calling terminal T. In this case, a nature field with the value "generic" is sent, followed by a number field with the value 88 88 89 99 00.

If the calling terminal T has a speed dial number 99999 that is not of DDI type that its user is willing to communicate together with that of the business to which it belongs (for example 88 88 89 99 00), two numbers can be used to designate the calling terminal T, which corresponds to a nature of "both" type (for example). In this case a nature field with the value "both" is used, followed by a first number field with the value 88 88 89 99 00 and a second field with the value 99999.

If the space is locally divided into areas known to the call center ECC, for example areas 10 meters by 10 meters, the calling terminal T is situated in area number 14, and the number of the business to which it belongs is 88 88 89 99 00, an area number (that of the business) can be used to designate the calling terminal T. In this case, a nature field with the value "area" is sent, followed by a first number field with the value 88 88 89 99 00 and a second field with the value 14.

The text message may equally comprise one or more other fields dedicated to the resolutions of the measured latitude, longitude and altitude.

It may equally comprise a field dedicated to data representative of the type of altitude measurement. The measured altitude, which is supplied by the location server SL, is not necessarily an absolute measurement relative to sea level or to the ground on which a building stands. It may be more precise, for example in buildings comprising many storeys, to supply the number of the storey on which the connection set-up request was effected. Also, the measurement may be given in meters or feet, depending on the country, or in any other local unit. Consequently, this "altitude type" field specifies the unit of measurement (meters, feet, level (or storey), etc.).

Figure 2:
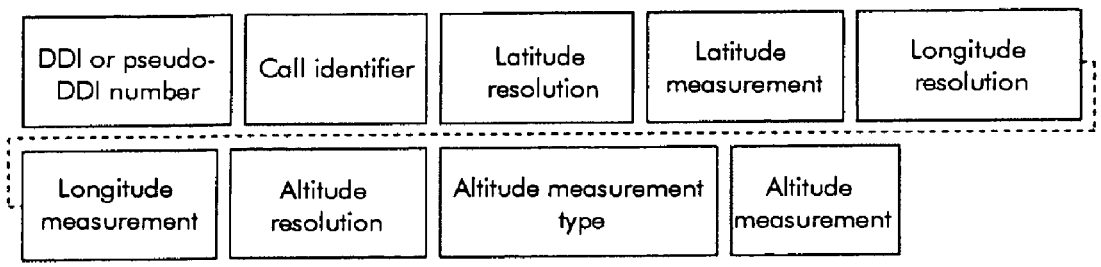
FIG. 2 is a diagram of one example of a text message of the invention.

FIG. 2 represents one example of an SMS type text message. In this example, which is given by way of illustration only, the text message includes a first field dedicated to the nature of the call identifier followed by a second field dedicated to the call identifier followed by a third field dedicated to the resolution of the latitude measurement followed by a fourth field dedicated to the latitude measurement followed by a fifth field dedicated to the resolution of the longitude measurement followed by a sixth field dedicated to the longitude measurement followed by a seventh field dedicated to the resolution of the altitude measurement followed by an eighth field dedicated to the altitude measurement type followed finally by a ninth field dedicated to the altitude measurement.

The fields dedicated to the resolutions of the location measurements may be defined by six bits indicating the number of meaningful bits in the location measurement concerned, for example, which is generally defined by a number of bits from nine, in the case of an integer, to 25, in the case of certain fractions. Moreover, the latitude measurement is defined between +90°, north of the equator, and −90°, south of the equator, for example. Moreover, the longitude measurement is defined between +180°, to the east of the prime meridian and −180°, to the west of the prime meridian, for example. Finally, the precision of the longitude is not linked only to the number of fraction bits, but also to the latitude, given that the meridians converge at the poles.

The emergency call center ECC comprises an association module MA that monitors signaling messages and text messages that it receives in order to attempt to associate them.

More precisely, if the emergency call center ECC receives a signaling message on the user-to-user signaling channel, it set up the telephone connection with the calling terminal T. The user of the calling terminal T and the operator at the emergency call center ECC can then speak to each other. Then, if the emergency call center ECC receives a text message, here in the form of an SMS type message, its association module MA compares the call identifier that it contains to that or those contained in signaling message(s) previously received on the user-to-user signaling channel. If the call identifier contained in the received text message is identical to the call identifier contained in a signaling message associated with a connection that has been set up, then the association module MA associates the location data contained in said received text message with that signaling message and therefore with the corresponding call. The association module MA then instructs the display on the screen of the emergency call center ECC of at least the location data. Alternatively, the location data may be fed to an application installed in the emergency call center ECC for locating the site of the call on a map or street plan. The same application, or another application, may be coupled to a database specifying the best ways to reach the located place, for example, possibly from access points external to the business or to the area in which it is situated. A database of this kind may equally include, in corresponding relationship to the various places listed, information on the hazards of any materials stored or fabricated there, for example.

Accordingly, the operator processing the call at the emergency call center ECC automatically sees on his screen at least the location of the terminal T with which a connection has been set up. He can then decide what measures to take in the light of information supplied to him by the user of the calling terminal T. He may in particular decide to send a response team to the location of the call as defined by the received location data.

The location aid device D, and in particular its processor module PM, and the association module MA may take the form of electronic circuits, software (or electronic data processing) modules, or a combination of circuits and software.

The invention is not limited to the location aid device D, call server SA, call center ECC and transmission method embodiments described above by way of example only, and encompasses all variants that the person skilled in the art might envisage that fall within the scope of the following claims.

The invention claimed is:

1. A method of sending call center data representative of a location of a communication terminal, the method comprising:
   generating and then sending to the call center the following messages:
      a signaling message requesting the setting up of a call between the terminal and the call center, wherein the signaling message comprises an unambiguous call identifier, and
      a location message comprising data representative of the location of the calling terminal and the unambiguous call identifier, and
   in the call center, associating the signaling message with the and a location message received by the call center and comprising the unambiguous call identifier,
   wherein generating the signaling message comprising the unambiguous call identifier comprises generating the unambiguous call identifier in a network node receiving the signaling message sent by the terminal and requesting the setting up of a call, wherein the unambiguous call identifier is integrated into the signaling message aimed at the call center and requesting the setting up of a call, and wherein generating the location message comprising the unambiguous call identifier comprises generating the location message and integrating the unambiguous call identifier into the location message;
   wherein said signaling message is a text message;
   wherein said text message includes a field dedicated to data representative of the nature of the unambiguous call identifier followed by a field dedicated to said unambiguous call identifier; and
   wherein said text message includes at least three fields dedicated to location data, a first field being dedicated to a latitude measurement, a second field being dedicated to a longitude measurement and a third field being dedicated to an altitude measurement.

2. The method according to claim 1, wherein the user-to-user signaling channel is used to send the text message over an integrated services digital network using synchronous time division multiplexing.

3. The method according to claim 1, wherein said text message is sent via electronic mail.

4. The method according to claim 1, wherein location data of the terminal is determined by a location server belonging to a network to which said terminal is connected, after which said text message is generated and sent by a text message server belonging to said network.

5. The method according to claim 1, characterized in that said nature of the unambiguous call identifier designates at least one number selected from:
   a direct dialing inwards number integrated into said signaling message and representing said terminal in the network to which it is connected,
   a pseudo-direct dialing inwards number integrated into said signaling message and representing said terminal in the network to which it is connected,
   a generic number integrated into said signaling message and representing an entity to which said terminal is attached,
   a generic number and a pseudo-direct dialing inward number, both integrated into said signaling message and respectively representing an entity to which said terminal is attached and said calling terminal in the network to which it is connected,
   a generic number and an area identifier, both integrated into said signaling message and respectively representing an entity to which said terminal is attached and a geographical area in which said terminal is situated.

6. The method according to claim 5, characterized in that said text message includes a field dedicated to data representative of the altitude measurement type.

7. The method according to claim 1, characterized in that said text message includes at least three fields respectively dedicated to the resolutions of the latitude, longitude and altitude measurements and respectively associated with said first, second and third location fields.

8. The method according to claim 1, characterized in that said unambiguous call identifier is placed in a free field of said signaling message requesting the setting up of a call between the terminal and a call center (ECC).

9. The method according to claim 1, characterized in that said unambiguous call identifier is a number selected from a selected set of numbers.

10. The method according to claim 9, characterized in that said set is specific to the network to which said calling terminal is connected.

11. A method of sending call center data representative of a location of a communication terminal, the method comprising:
   generating and then sending to the call center the following messages:
      a signaling message requesting the setting up of a call between the terminal and the call center, wherein the signaling message comprises an unambiguous call identifier, and
      a location message comprising data representative of the location of the calling terminal and the unambiguous call identifier, and
   in the call center, associating the signaling message with the location message received by the call center and comprising the unambiguous call identifier,
   wherein generating the signaling message comprising the unambiguous call identifier comprises generating the unambiguous call identifier in a network node receiving the signaling message sent by the terminal and requesting the setting up of a call, wherein the unambiguous call identifier is integrated into the signaling message aimed at the call center and requesting the setting up of a call, and wherein generating the location message comprising the unambiguous call identifier comprises generating the location message and integrating the unambiguous call identifier into the location message;
   wherein said signaling message is a text message;
   wherein said text message is sent via an SMS type short message; and
   wherein said text message includes a field dedicated to data representative of the nature of the unambiguous call identifier followed by a field dedicated to said unambiguous call identifier; and
   wherein said text message includes at least three fields dedicated to location data, a first field being dedicated to a latitude measurement, a second field being dedicated to a longitude measurement and a third field being dedicated to an altitude measurement.

12. A device for aiding the location of a communication terminal by a call center, characterized in that it comprises means for:
   receiving a signaling message sent by the terminal and requesting the setting up of a call between the terminal and a call center and then determining an unambiguous call identifier in a network node, instructing the sending of the unambiguous call identifier to said call center in the signaling message requesting the setting up of a call, generating a text type message including data representative of the location of said terminal and the unambiguous calling identifier, and instructing the sending of said text message to said call center so the said call center can associate the location data that it contains with said signaling message requesting the setting up of a call;

wherein said text message includes a field dedicated to data representative of the nature of the unambiguous call identifier followed by a field dedicated to said unambiguous call identifier; and wherein said text message includes at least three fields dedicated to location data, a first field being dedicated to a latitude measurement, a second field being dedicated to a longitude measurement and a third field being dedicated to an altitude measurement.

* * * * *